(12) United States Patent
Dieckmann et al.

(10) Patent No.: US 6,193,021 B1
(45) Date of Patent: Feb. 27, 2001

(54) METHOD AND DEVICE FOR ADJUSTING OR ALTERING THE PLAY BETWEEN BRAKE LININGS AND FRICTION SURFACES OF MOTOR VEHICLE BRAKES

(75) Inventors: Thomas Dieckmann, Pattensen; Christof Maron, Regenstanf, both of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/277,377

(22) Filed: Mar. 29, 1999

(30) Foreign Application Priority Data

Mar. 28, 1998 (DE) ................................................ 198139128

(51) Int. Cl.$^7$ ...................................................... B60T 1/06
(52) U.S. Cl. ................ 188/1.11 E; 188/158; 188/196 R
(58) Field of Search ......................... 303/3, 113.1, 113.2, 303/113.5, 139, 1.11 E; 188/156, 163, 196 R, 347, 348

(56) References Cited

U.S. PATENT DOCUMENTS

| 4,146,108 | * | 3/1979 | Sato ..................................... 188/163 |
| 5,107,967 | * | 4/1992 | Fujita et al. .......................... 188/72.1 |
| 5,366,280 | * | 11/1994 | Littlejohn ................................ 303/3 |
| 6,000,507 | | 12/1999 | Böhm et al. . | |

FOREIGN PATENT DOCUMENTS

| 4021572A1 | 1/1991 | (DE) . |
| 4433377A1 | 3/1996 | (DE) . |
| 195 36 694 A1 | 4/1997 | (DE) . |
| 196 07 048 A1 | 8/1997 | (DE) . |
| 197 34 567 A1 | 1/1999 | (DE) . |
| 0909687 | * 9/1998 | (EP) . |
| 2250070 | * 5/1992 | (GB) . |

\* cited by examiner

*Primary Examiner*—Chris Schwartz
(74) *Attorney, Agent, or Firm*—Smith, Gambrell & Russell, LLP

(57) ABSTRACT

A method for adjusting or altering the play between brake linings and friction surfaces of motor vehicle brakes by means of controllable and adjustable lifting and return movements of the brake linings is disclosed. In this case, the play is altered as a function of the actuation of the gas pedal, such that the play is reduced if the pressure exerted on the gas pedal is reduced and/or if the gas pedal is released. The device for adjusting or altering the play between brake linings and friction surfaces of motor vehicle brakes contains a brake control/brake regulator (4) for acquiring and processing electronic signals delivered by a brake pedal sensor (2) and, if so required, other sensors, and for actuating electromechanical brake actuators (5). The brake control/brake regulator (4) of the device also processes data or signals pertaining to the status of the gas pedal actuation in such a way that the brake actuators (5) reduce the play if the pressure exerted on the gas pedal is reduced and/or if the gas pedal is released.

12 Claims, 1 Drawing Sheet

METHOD AND DEVICE FOR ADJUSTING OR ALTERING THE PLAY BETWEEN BRAKE LININGS AND FRICTION SURFACES OF MOTOR VEHICLE BRAKES

INTRODUCTION AND BACKGROUND

The present invention pertains to a method for adjusting or altering the play between brake linings and friction surfaces of motor vehicle brakes by means of controllable and adjustable lifting and return movements of the brake linings.

The present invention also pertains to a device for adjusting or altering the play between brake linings and friction surfaces of motor vehicle brakes, wherein said device contains a brake control/brake regulator for acquiring and processing electronic signals delivered by a brake pedal sensor and, optionally, additional sensors, and for actuating electromechanical brake actuators.

In recent years, electromechanical brake systems, namely so-called brake systems of the brake-by-wire type, have been introduced on the market and developed for motor vehicles, in particular, passenger cars. In brake systems of this type, the influence of the force applied to the brake pedal by the driver is measured by a sensor, converted into an electronic signal and forwarded to brake actuators. Such a brake actuator is assigned to each wheel of the motor vehicle. These brake actuators usually exert a tension force on the brake linings by means of a device that is driven by an electric motor, i.e., the brake linings are pressed against the disk of the wheel brake. One embodiment of such an electromechanical disk brake system for motor vehicles is, for example, known from DE 40 21 572 A1.

A method and the device of the type discussed above which allow an electronically controlled adjustment of the play between the brake linings and the friction surfaces of motor vehicle brakes is known from DE 44 33 377 A1. This method and the corresponding device utilize a brake control/brake regulator which, except during the brake actuating phases, make it possible to adjust a defined play between the brake linings and the respective friction surfaces. In that case, it is particularly important to optimize the lifting and return movements in such a way that the lifting movement ceases once a complete release of the brakes and consequently an unobstructed turning of the wheels is realized, and that a fast engagement between the brake linings and the friction surfaces is achieved. The active lifting of the brake linings off of the respective friction surfaces reduces the residual moment of friction, and consequently the wear of the brake linings. In addition, the fuel consumption of the motor vehicle is correspondingly reduced. The process of lifting the brake linings off of the respective friction surfaces is realized with the aid of an electric actuator that operates in the reverse direction and may also serve for actuating the brake during normal braking mode. In this case, the brake control/brake regulator may also serve for regularly increasing and decreasing the play by a small amount, e.g., after each time the engine is started, in order to ensure the unobstructed movement of brake components to be moved in mechanical fashion. In addition, it is possible to actuate the brakes briefly and regularly during wet weather in order to remove the film of liquid, such that the brake actuation cannot be noticed by the driver.

According to this known method and the respectively known device, it is of primary importance to ensure the basic function of an active, complete release of the brake. This means that a play of such a size is adjusted that, once the brake is actuated, the play initially must be overcome before a braking force is generated. However, the process of overcoming this play requires time and increases the braking time as well as the stopping distance.

Consequently, it is an object of the present invention to avoid the disadvantages of known systems.

SUMMARY OF THE INVENTION

The above and other objects of the present invention can be achieved by altering the amount of play as a function of an actuation of the gas pedal, whereby the play is reduced when the pressure exerted on the gas pedal is reduced or ceases.

With respect to the device according to the invention, the aforementioned object is attained due to the fact that the brake control/brake regulator also processes data or signals pertaining to the status of the gas pedal actuation in such a way that the brake actuators reduce the play if the pressure exerted on the gas pedal is reduced and/or if the gas pedal is released.

Consequently, the time required for changing from an actuation of the gas pedal to actuation of the brake pedal is utilized to overcome the play, i.e., it is ensured that the braking effect is initiated immediately once the brake pedal is actuated. Since the play is reduced when the gas pedal pressure is reduced or the driver completely releases the gas pedal, the function is never dependent on actuation of the brake pedal.

It is advantageous to adjust a greater play if no actuation of the brake pedal is expected. According to an additional feature of the invention, an already executed reduction of the play is reversed if the gas pedal is actuated again without initiating a braking maneuver or if the pressure exerted on the gas pedal is again increased.

However, it is also advantageous that a reduction of the play not be reinitiated each time a slight reduction of the gas pedal pressure occurs. According to one embodiment of the invention, the reduction of the play is initiated as a function of a certain reduction in the gas pedal pressure.

According to another variation of the new method, an alteration of the play may also be carried out as a function of the motor vehicle speed, wherein the play is reduced at a higher speed. This measure also increases the safety of the brake system.

In this context, it may also be advantageous that the play be reduced essentially continuously once a certain motor vehicle speed is exceeded to the smallest adjustable value as the speed increases.

BRIEF DESCRIPTION OF DRAWING

The present invention will be further understood with reference to the drawing wherein.

DETAILED DESCRIPTION OF INVENTION

Figure 1:
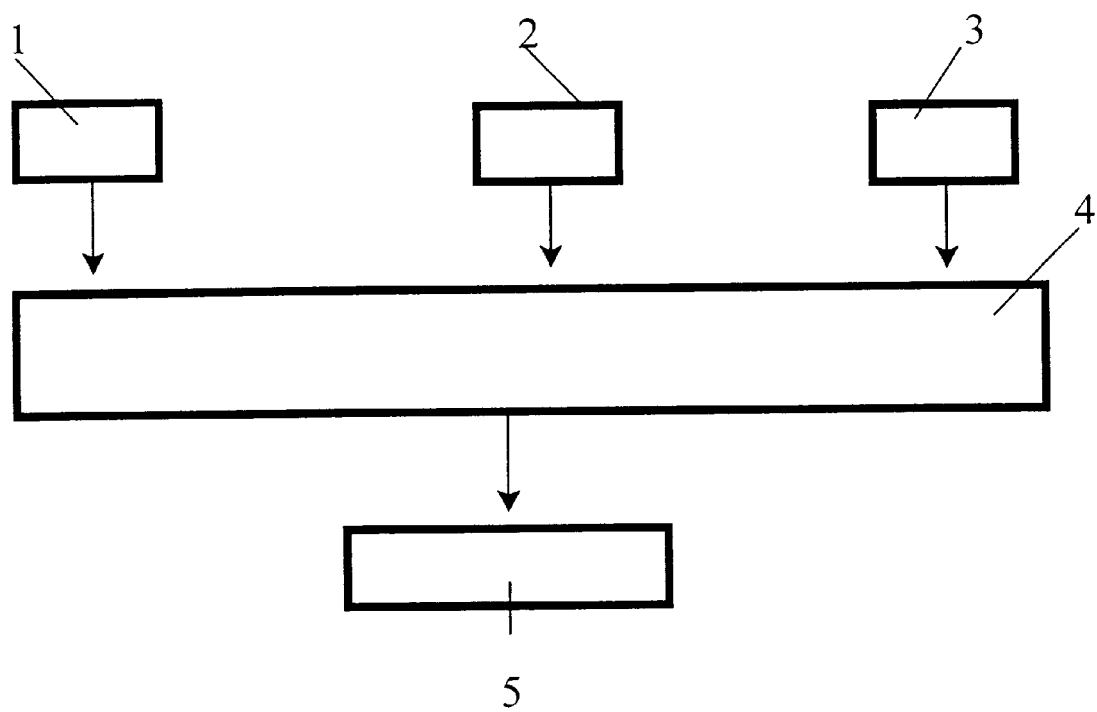
FIG. 1 shows a block diagram of the basic functioning of the present invention.

The method according to the invention is carried out with the aid of a brake control/brake regulator, in which the signals delivered by a gas pedal sensor and, optionally, a speed sensor are also processed. The brake control/brake regulator controls electromechanical brake actuators.

The device according to the invention may also be embodied in such a way that the brake control/brake regulator initiates a reduction of the play as a function of a certain reduction in the gas pedal pressure.

The device according to the invention may also contain a speed sensor, the data or signals of which are also processed in the brake control/brake regulator in such a way that the brake actuators reduce the play at a higher speed. The device advantageously operates in such a way that a reduction of the play is initiated starting at a certain speed.

The data or signals pertaining to the status of the gas pedal actuation which are received in the brake control/brake regulator may be advantageously generated by a device that is already installed in the motor vehicle. This device may, for example, consist of the idle switch or, in correspondingly equipped motor vehicles, an electric gas pedal actuator.

Additional characteristics, advantages and details of the invention are described in greater detail below with reference to the only FIGURE (FIG. 1) which shows a block diagram of the basic function of the present invention.

The method and the device according to the invention are intended for motor vehicles with an electromechanical brake system of the brake-by-wire type. In this case, each wheel is provided with a brake actuator. The basic function of such a brake system consists of detecting a brake pedal actuation with the aid of a sensor and a subsequent conversion into electronic signals. These signals are sent to brake actuators that respectively press the brake linings against the brake disk, e.g., by means of a device that is driven by an electric motor.

In electromechanical brake systems of the brake-by-wire type, the brake linings can be actively retracted from the brake disk while the brake pedal is not actuated, e.g., in accordance with the previously described state of the art according to DE 44 33 377 A1. Consequently, a defined play is adjusted between the brake linings and the friction surfaces of the disk brake system.

According to the invention, a greater play, e.g., the maximum play available, is basically adjusted in instances in which the brake pedal is not actuated when the brake system receives information regarding the fact that the gas pedal is actuated. However, the increased play is immediately reduced once the driver removes his foot from the gas pedal regardless of whether or not the brake pedal is actuated. This means that the time required for changing from an actuated gas pedal to an actuated brake pedal is utilized for overcoming the play, i.e., the brake force is immediately generated once the brake pedal is actuated.

The block diagram shown in FIG. 1 indicates that a gas pedal sensor 1 determines whether the gas pedal is actuated or not and, optionally, whether the pressure exerted on the gas pedal is increased or decreased. With mechanical gas pedals, the idle switch which merely delivers information regarding whether the gas pedal is actuated or not may be used as the gas pedal sensor 1. Modem motor vehicles are frequently equipped with an electronic gas pedal actuator which may provide additional information regarding whether the pressure exerted on the gas pedal is increased or decreased.

A brake pedal sensor 2 delivers information regarding whether and to what extent the brake pedal is actuated. The information received from the individual sensors 1 and 2 either is already available in the form of electronic signals or is converted into electronic signals in suitable fashion.

These signals are fed to an electronic brake control/brake regulator 4 and additionally processed in such a way that a corresponding control of the brake actuators 5 can be realized. The brake control/brake regulator 4 ensures that a greater play is adjusted when the gas pedal is actuated. The increased play is reduced under the corresponding control of the brake actuators 5 via the electronic signals received from the gas pedal sensor 1 once the driver removes his foot from the gas pedal or reduces the pressure exerted on the gas pedal. In instances in which a braking maneuver is initiated by actuating the brake pedal, the previously reduced play ensures that the braking force is immediately generated once the brake pedal is actuated. If the gas pedal is actuated again without initiating a braking maneuver or the pressure exerted upon the gas pedal is increased again, the brake control/brake regulator 4 controls the brake actuators in such a way that the play is again increased.

It is, in principle, practical to observe corresponding safety regarding the free mobility if a greater play is adjusted in order reliably to prevent unintentional contact between the brake linings and the brake disks.

The brake control/brake regulator 4 may be designed in such a way that increased play is only reduced if certain distances are exceeded during the actuation of the gas pedal. In this way, it is ensured that slight corrections of the driving speed which frequently occur during normal driving do not cause actuation of the brake actuators 5.

In addition, a speed sensor 3 may provide data pertaining to the actual driving speed or changes in the driving speed. This data is additionally processed in the brake control/brake regulator 4 in such a way that the play is slightly reduced at a higher speed so as to ensure a particularly fast response of the brakes. However, the play may remain comparatively large at slow speeds in order to prevent unintentional residual friction between the brake linings and the friction surfaces of the disk brake system.

The function and design of the brake actuators, e.g., the utilization of electromechanical actuators that actuate the brake linings in order to decrease or increase the play, may correspond to those of conventional brake actuators.

The motor vehicle may also be equipped with means for representing motor vehicle data (motor vehicle bus data), e.g., according to the state of the art defined by DE 44 33 377 A1. This data pertains, for example, to the speed of a windshield wiper operating signal or the like. The brake actuators may also be conventionally actuated by means of conventional brake systems, such as ABS, ASR, FDR or the like.

In the previously described embodiment, the amount of play is altered and adjusted by means of a control unit. This represents a very practical solution. However, a separate control by means of distance sensors for measuring the actual play between the brake linings and the brake disk of each motor vehicle wheel may also be provided. However, the latter solution would be associated with higher mechanical and electrical expense.

Further variations and modifications will be apparent to those skilled in the art from the foregoing and are intended to be encompassed by the claims appended hereto.

German priority application 198 13 912.8 is relied on and incorporated herein by reference.

We claim:

1. A method for altering the play between brake linings and friction surfaces of motor vehicle brakes by means of controllable lifting and return movements of the brake linings, comprising altering the play as a function of gas pedal actuation, wherein the play is reduced if the pressure exerted on the gas pedal is reduced and/or if the gas pedal is released and wherein a change in play is carried out as a function of the motor vehicle speed, wherein the play is reduced at a higher driving speed.

2. The method according to claim 1, wherein the play is essentially reduced continuously once a certain motor vehicle speed is exceeded to the smallest adjustable value as the speed increases.

3. The method according to claim 1, wherein said method is carried out with the aid of a brake control/brake regulator, in which the electronic signals received from a gas pedal sensor and a speed sensor are also processed for controlling electromechanical brake actuators.

4. The method according to claim 1, wherein an already executed reduction of play is reversed if the gas pedal is actuated again without initiating a braking maneuver or if the pressure exerted upon the gas pedal is again increased.

5. The method according to claim 1, wherein a reduction of play is initiated as a function of a predetermined reduction in the gas pedal pressure.

6. The method according to claim 1, wherein a reduction of play is initiated as a function of a predetermined reduction in the gas pedal pressure.

7. A device for altering the play between brake linings and friction surfaces of motor vehicle brakes, comprising a brake control/brake regulator for acquiring and processing electronic signals received from a brake pedal sensor, optionally, additional sensors, for actuating electromechanical brake actuators, said brake control/brake regulator also processes data or signals pertaining to the status of the gas pedal actuation in such a way that the brake actuators reduce the play if the pressure exerted on the gas pedal is reduced and/or the gas pedal is released, wherein the device contains an additional speed sensor, the data or signals of which are additionally processed in the brake control/brake regulator such that the brake actuators reduce the play at a higher driving speed.

8. The device according to claim 7, wherein a reduction of play is initiated starting at a certain speed.

9. The device according to claim 7, wherein the brake control/brake regulator initiates a reduction of play as a function of a certain reduction in gas pedal pressure.

10. The device according to claim 7, wherein the data or signals pertaining to the status of the gas pedal actuation are delivered by an idle switch of the motor vehicle.

11. The device according to claim 7, wherein the data or signals pertaining to the status of the gas pedal actuation are delivered by an electronic gas pedal actuator.

12. An automobile equipped with the device of claim 7.

* * * * *